UNITED STATES PATENT OFFICE.

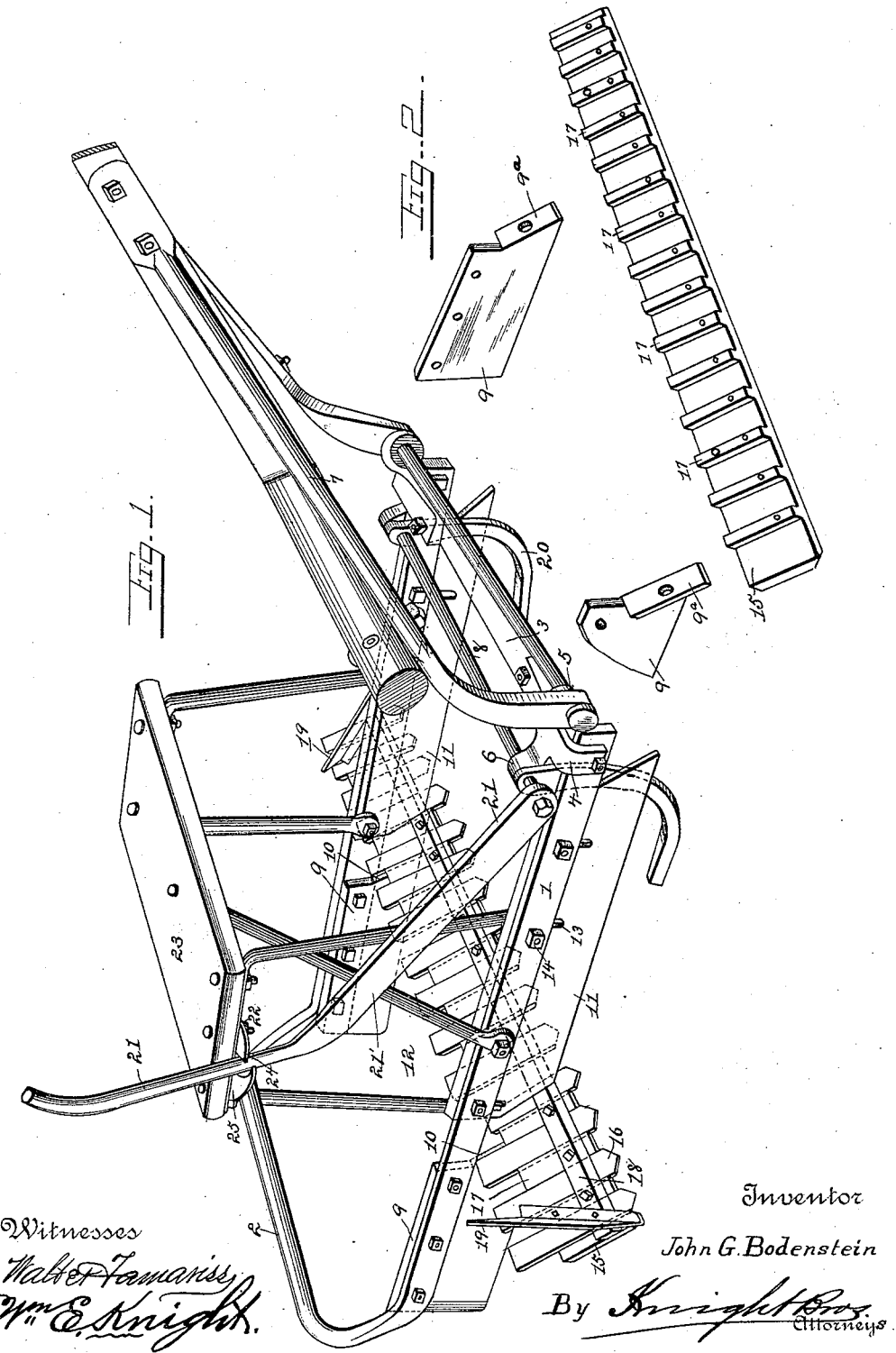

JOHN G. BODENSTEIN, OF STAATSBURG, NEW YORK.

ICE-CULTIVATOR.

SPECIFICATION forming part of Letters Patent No. 470,099, dated March 1, 1892.

Application filed March 9, 1891. Serial No. 384,377. (No model.)

*To all whom it may concern:*

Be it known that I, JOHN G. BODENSTEIN, a citizen of the United States, residing at Staatsburg, county of Dutchess, State of New York, have invented a new and useful Ice-Cultivator, of which the following is a specification.

My invention relates to a machine or implement adapted for loosening snow-ice upon top of an ice field so that it can readily be removed with an ice-scraper and so render the ice fit for cutting up and storage.

The object of my invention is to provide such a cultivator capable of doing heavier work and of doing it more rapidly and effectively than has been possible with earlier machines and at the same time enabling the dispensing with several men and so lessening the expense of clearing off the snow-ice.

In the accompanying drawings, Figure 1 represents my improved machine in perspective. Fig. 2 shows the cutter-bar and the rear runners detached.

The frame of the machine is made up of two iron side bars 1 1, connected at rear by a handle 2 and at front by a cross-bar 3. Angle couplings 4 are bolted at each side of the frame to the bars 1 and cross-bar 3, and each of said couplings has two ears 5 6. Said ears lie in vertical planes, the ears 5 5 projecting forward and affording bearing for the pole or shaft irons 7, while the ears 6, projecting rearwardly-afford bearings for the cross-shaft 8, hereinafter referred to.

Bolted rigidly to the rear ends of bars 1 are runners 9 9, which have inclined forward ends, as shown at 10 10. Farther forward on the beams 1 are fastened adjustable runners 11 11, while between the runners 9 and 11 is left a space of sufficient width to receive a cutter-bar 12. I am thus enabled to make a cutter-bar of considerable length projecting at some distance at each side of the runners and so the machine operates on a space of greater width than the distance between the runners.

Heretofore machines analogous to this one have been so made that the snow-ice is loosened only between the runners, so that the operator on reaching one end of a furrow is obliged to return on his work with only one runner on the loosened ice, and the result is that the machine is tilted, and after the furrow the ice is always cut on a slant. With my present machine both runners are always on the loosened portion of the ice and the machine travels level. Vertical adjustment of the forward runners 11 11 is provided for by forming in said runners slots 13, through which fastening-bolts 14 on bars 1 1 pass. The depth of penetration of the teeth of cutter-bar 12 is thus regulated to the thickness of snow-ice on the field. By raising the runners 11 11 sufficiently I can with this machine cause the teeth to remove snow-ice to the depth of three inches, which is considerably in excess of what has been possible with earlier machines. The front ends of the adjustable runners 11 11 are chisel-shaped and steel-pointed, as shown, so that instead of riding over obstructions and so causing an irregular depth of penetration of the cutter-bar the runners will cut through obstructions and maintain the machine on a constant level. The cutter-bar 12 is bolted to flanges $9^a$ $9^a$ on the front edges of the fixed rear runners 9 9. This cutter-bar is made up of a plate or bar 15, having a series of transverse ribs or keys 17, with spaces between them, the pointed and edged cutting-teeth 16, held between said ribs or keys, and a longitudinal retaining-bar 18, common to all the teeth and bolted through ribs or keys 17 to plate or bar 15, so as to hold all the teeth in place. The teeth are thus securely and adjustably held; but adjustment of the teeth individually is not resorted to, except in case of wear. The presentation of the cutter-bar is, as before stated, regulated by the forward runners 11 11.

19 19 are clearing-shoes, one at each end of the cutter-bar, arranged vertically to the plane of the cutter-bar and obliquely to its length and adapted to throw inward the loose ice thrown up by the two outermost teeth at each end of the cutter-bar. This makes at each side of the furrow a comparatively clear space, which will guide the operator on the return furrow. Heretofore the broken ice has not been cleared from the adjacent field, rendering it difficult to discern the place last stirred by the cultivator. When on reaching the end of a furrow or returning from or going to work it is desirable to throw the teeth out of operation, I employ the following mechanism: 20 20 are two curved shoes fixed at one end to the cross-shaft 8, already referred to, to which is also bolted, keyed, or otherwise rigidly attached a hand-lever 21. This hand-lever at any convenient point 21' is of flattened spring-steel, enabling it to yield laterally without permanently changing its shape. 22 is a catch for said lever fixed to the right-side edge of the driver's seat 23. This catch has a hook 24, which retains the lever from forward movement, and an arm 25, which protects the lever from being accidentally thrown out so far as to bend it. It will be seen that by pulling the hand-lever back to the position shown in the drawings and catching it on the hook 24 the shoes 20 are thrown down, so as to lift the forward end of the machine, enabling the teeth to clear the ice, and in this position the machine will travel easily on the shoes 20 and the rear ends of runners 9 9.

Having thus described my invention, the following is what I claim as new therein and desire to secure by Letters Patent:

1. In an ice-cultivator, the combination, with a suitable frame having means for drawing it, of the divided runners on the sides of the frame and a fixed transverse cutter-bar also mounted on the frame and passing between the parts of the respective divided runners and extending beyond the side of the frame, so as to cut beyond the line of the runner and reach the edge of the preceding cut without bringing the adjacent runner on the broken ice, as explained.

2. In a machine for removing surface ice, the combination of a suitable frame, a pair of runners secured to the rear part of the frame and having the bearings on their forward ends, the fixed cutter-bar secured to the said bearings on the forward ends of the rear runners and being of such length as to extend beyond the side of the frame and to make a cut beyond the runner, and the gage-runners in front of the cutter-bar and secured to the frame by means of the slots and bolts, whereby they are made adjustable for regulating the depth of the cut, substantially as and for the purpose set forth.

3. In an ice-cultivator, the cutter consisting of the cross-bar 15, having a series of spaced transverse ribs or keys 17, the cutting-teeth held between said ribs or keys and projecting below the edge of said bar, and the common retaining-bar 18 for holding said teeth in position, substantially as and for the purpose set forth.

4. In an ice-cultivator, the combination of the runners 9, having the inclined flanges $9^a$, the inclined bar 15, secured to said flanges and having the transverse ribs or keys, the cutting-teeth 16, arranged between said ribs or keys, the retaining-bar 18 for holding the teeth between the ribs or keys, and the clearing-shoe 19, substantially as and for the purpose set forth.

5. In an ice-cultivator, the combination of the side bars, the angle-couplings bolted to said side bars and having the ears 5 6, the draft-tongue journaled in said ears 5, the shaft 8, journaled in the ears 6, the shoes 20, secured to said shaft and being curved inwardly at their lower ends, a flexible lever secured to said shaft for rotating said shoes, the catch for said lever, and the runners and cutter-bar secured to said side bar, substantially as set forth.

6. In an ice-cultivator, the combination of the frame having the divided runners, the rigidly-attached transverse cutter-bar located in the space between the parts of the divided runners and extending and adapted to cut beyond the sides of the frame, the front transverse shaft journaled on the frame and having the downwardly and rearwardly curved shoes for elevating the front part of the machine and removing the cutting-teeth from the ice, and the lever for controlling the rotation of the shaft, all substantially as and for the purpose set forth.

7. In an ice-cultivator, the combination of the frame 1 3, the angle-couplings 4, having ears 5 6, the lever hung on the rod 8, passing through the ears 6, and the pole or shaft irons 7, hung on the ears 5, substantially as and for the purposes set forth.

JOHN G. BODENSTEIN.

Witnesses:
GEORGE L. HEPP,
WILLIAM R. GOWAN.